(No Model.)

E. PECKHAM.
CAR AXLE.

No. 352,657. Patented Nov. 16, 1886.

WITNESSES
C. Bendixon
A. F. Walz

INVENTOR
Edgar Peckham
per Knell, Lasset Hey
his Attys

UNITED STATES PATENT OFFICE.

EDGAR PECKHAM, OF SYRACUSE, NEW YORK, ASSIGNOR TO THE NATIONAL TUBE WORKS COMPANY, OF BOSTON, MASSACHUSETTS.

CAR-AXLE.

SPECIFICATION forming part of Letters Patent No. 352,657, dated November 16, 1886.

Application filed March 25, 1886. Serial No. 196,509. (No model.)

*To all whom it may concern:*

Be it known that I, EDGAR PECKHAM, of Syracuse, in the county of Onondaga, in the State of New York, have invented new and useful Improvements in Car-Axles, of which the following, taken in connection with the accompanying drawings, is a full, clear, and exact description.

The object of this invention is to obtain an axle for a car or other vehicle in which shall be combined minimum weight with maximum strength; and to that end my invention consists, chiefly, in forming the axle of a metal tube re-enforced by internal tubular bushings extending from the extremities of the main tube inward beyond the attachments of the wheels, and portions of said main tube and its bushings compressed circumferentially to form the journals, as hereinafter more fully described, and specifically set forth in the claim.

Figure 2:
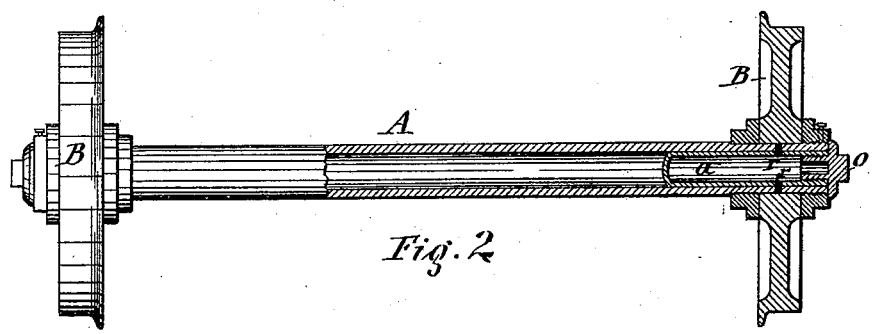
Figure 1:
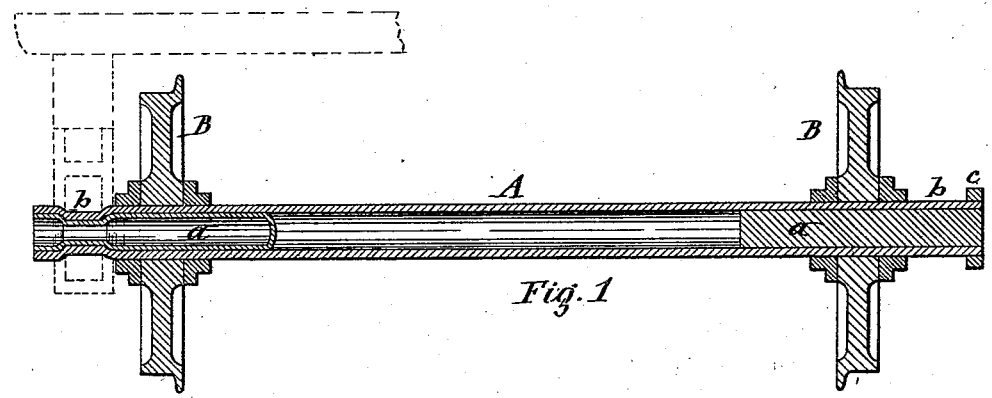

In the annexed drawings, Figure 1 is a longitudinal section of my improved car-axle, and Fig. 2 is partly a side view and partly a longitudinal section of a car-axle embodying my invention.

Similar letters of reference indicate corresponding parts.

A represents the axle, which I form of a metal tube, and B B denote the car-wheels attached to said axle. It being an established fact that vehicle-axles receive the greatest strain at or near the inner end of the wheel-hubs, I re-enforce said tubular axle at said points by inserting therein tubular bushings $a\ a$, extending from the extremities of the axle or main tube to points beyond the attachments of the wheels, and the journals $b\ b$, I form by compressing circumferentially the main tube together with its inclosed bushings, the latter becoming thereby securely locked in the axle. By the employment of the tubular bushings I permit the entrance of air into the interior of the journals, and thus obviate in a great measure the danger of the journals becoming heated.

In case the wheel is to be loose to allow it to revolve on the axle I can make the axle self-lubricating by closing the inner end of the bushing $a$ and providing the outer end with a removable plug, $o$, and drilling radially through the axle and its bushings one or more lubricating-channels, $r\ r$, as shown in Fig. 2 of the drawings, thereby converting the bushing $a$ into a lubricant-reservoir, similar to that shown in my prior patent of March 10, 1885, the lubricant being introduced into said reservoir through the outer end thereof, the plug $o$ being made removable for that purpose.

Having described my invention, what I claim as new, and desire to secure by Letters Patent, is—

A car-axle composed of a main tube, and tubular bushings in said main tube, extending from the extremities thereof inward beyond the attachments of the wheels, and portions of said main tube and its bushings compressed circumferentially to form the journals, substantially as described and shown.

In testimony whereof I have hereunto signed my name and affixed my seal, in the presence of two attesting witnesses, at Syracuse, in the county of Onondaga, in the State of New York, this 18th day of March, 1886.

EDGAR PECKHAM. [L. S.]

Witnesses:
 FREDERICK H. GIBBS,
 C. BENDIXON.